No. 624,036. Patented May 2, 1899.
W. L. HUFFMAN.
WHEEL.
(Application filed June 30, 1898.)
(No Model.)
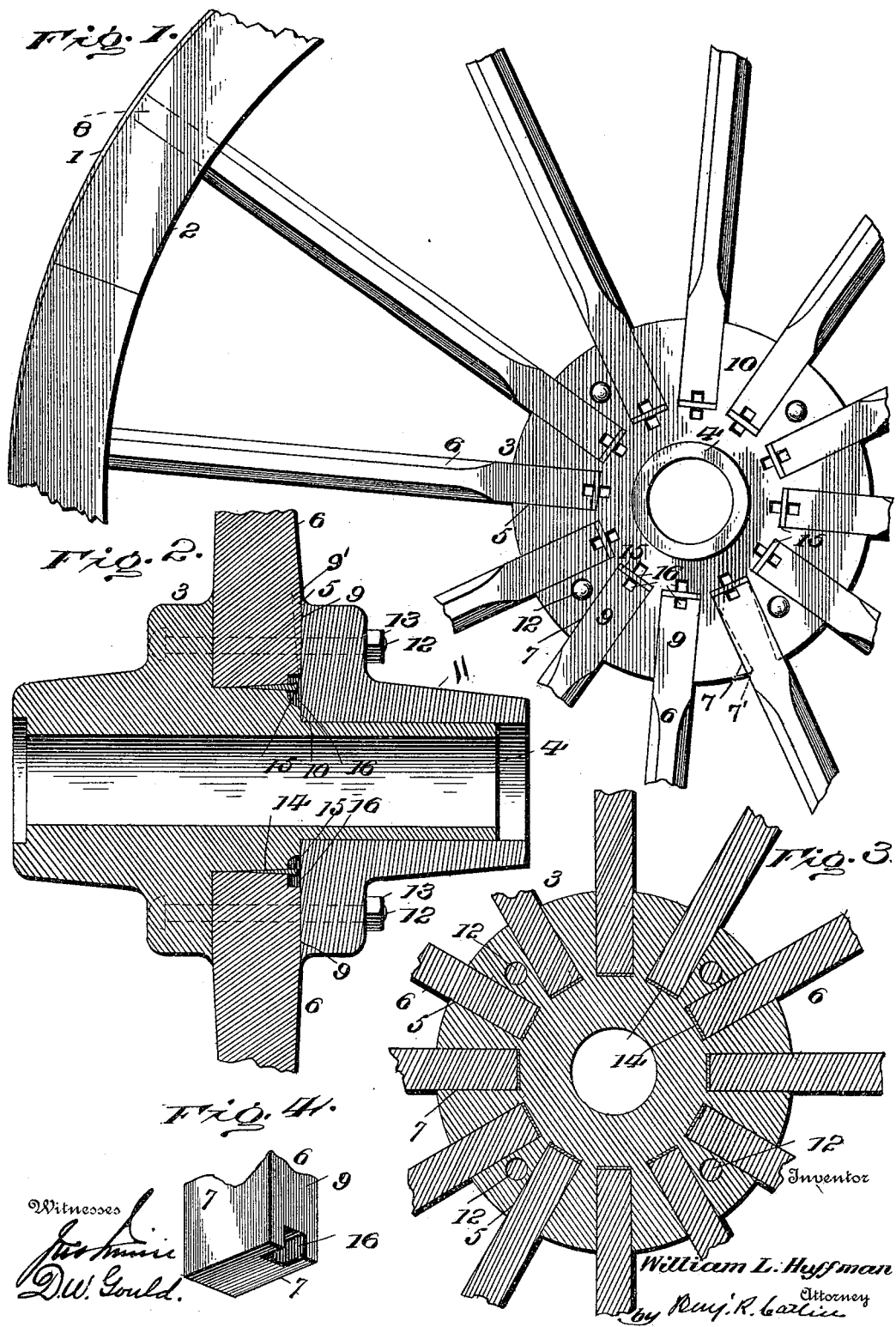
Witnesses
D. W. Gould.
Inventor
William L. Huffman
by Benj. R. Catlin
Attorney
THE NORRIS PETERS CO., PHOTO-LITHO., WASHINGTON, D. C.

UNITED STATES PATENT OFFICE.

WILLIAM L. HUFFMAN, OF WOODVILLE, VIRGINIA, ASSIGNOR OF ONE-HALF TO S. RUSSELL SMITH, OF CULPEPER, VIRGINIA.

WHEEL.

SPECIFICATION forming part of Letters Patent No. 624,036, dated May 2, 1899.

Application filed June 30, 1898. Serial No. 684,844. (No model.)

*To all whom it may concern:*

Be it known that I, WILLIAM L. HUFFMAN, a resident of Woodville, in the county of Rappahannock and State of Virginia, have invented certain new and useful Improvements in Wheels; and I do hereby declare the following to be a full, clear, and exact description of the invention, such as will enable others skilled in the art to which it pertains to make and use the same.

The invention relates to wheels, and has for its object to provide a durable wheel capable of general use that can be readily guarded against the injurious effects of shrinkage and which can be easily tightened or repaired by persons of ordinary skill.

The invention consists in the construction hereinafter described and pointed out.

In the accompanying drawings, Figure 1 is a partial elevation of the wheel, a hub-cap being removed and the wheel-rim broken away. Fig. 2 is a longitudinal section of the hub and immediately-connected parts. Fig. 3 is a transverse section of the hub with spoke ends in place. Fig. 4 is a perspective of the end of a spoke.

In the improved wheel the tire 1 and the fellies 2 may be of any desired or usual construction and particular description is unnecessary.

3 denotes a hub, made by preference of cast metal, a good quality of steel being very suitable. The hub is formed with an annular extension 4. This extension provides a bearing for the axle continuous with the bore of the hub and is in effect an axle-box.

5 denotes slots, sockets, or mortises formed in the hub to receive the inner ends of the spokes 6. The latter have parallel bearing-faces 7 near their ends which enter the slots 5, and the sides of said slots are also parallel and fit the spokes. The latter are preferably without the usual shoulders and wedge form, though in some cases they may be made of an inverted-wedge form, as indicated by dotted lines at 7' in Fig. 1. In some cases the spoke ends may be made of an inverted-wedge form from edge to edge and the cap given a dished form to correspond, as indicated in dotted lines at 9' in Fig. 2. The outer ends of the spokes have tenons 8, entering mortises in the fellies. Their edges 9 are flush with the inner face 10 of the hub or may in some cases extend out slightly beyond said hub.

11 denotes a hub-cap fitted over the box 4 and held firmly and closely against the edges 9 of the spokes and the face 10 of the hub by means such as screw-bolts 12. The cap is detachably secured by means of said bolts and nuts 13. They may be made of the same material as the hub or of any suitable material. It would be practicable to use wood, though cast metal is preferred.

The parts of the wheel may be assembled by driving the spokes into the hub-sockets and then applying the fellies and tire in usual manner and then bolting the hub-cap in place.

The tire may be set in any usual manner. The construction, however, is intended to provide for tightening the wheel and particularly after shrinkage of the fellies and spokes. This is effected by means of wedges 14, preferably of metal, driven between the ends of the spokes and the bottom of the hub-sockets, as indicated. These wedges may be provided with heads 15, if desired, for convenience in driving or in withdrawing the same by the use of a tool. The spokes and the hub are cut away at 16 to provide for the introduction of such tool and also to receive the head of a wedge-driver.

In case a wheel gives indication of shrinkage and of a loosening of the spokes wedges may be driven between their ends and the hub. If such wedges have been previously introduced, they can be driven farther, if required, or thicker wedges may be substituted.

It is obvious that the spokes are removable after the hub-cap has been detached. If one or more spokes are broken, they can therefore be easily replaced by sound ones and by any person of ordinary intelligence and skill, and in case of shrinkage the wheel can be tightened without the aid of a smith.

Heretofore wedges have been used to tighten wheels, a screw-ring bearing on all the wedges being adapted to force them home equally. By the present invention expensive screws are dispensed with, and the spokes are adapted to be separately tightened and according to the need in particular cases. Recesses are provided in the hub and in the spokes to give access to the wedges either for driving or withdrawing them. In case either the hub or the cap overhangs the spokes, as indicated by 7' or 9', respectively, each spoke can be separately tightened both in the hub and between it and the wheel-rim.

Having described my invention, I claim—

1. In a wheel, the spokes, the hub provided with spoke-sockets each open at the hub circumference and also at its end, a separable device for holding the spokes endwise the hub, and wedges, the ends of the spokes and adjacent parts of the hub being recessed to admit a tool either to drive or withdraw the wedges, substantially as described.

2. In a wheel, the spokes, the hub provided with spoke-sockets each open at the hub circumference and also at its end, a separable device for holding the spokes endwise the hub, and wedges, one for each spoke, the spoke seats or sockets having faces inclined to each other toward their outer part and corresponding to inclined faces on the spokes, whereby the wedges may be used to tighten more or less of the spokes between the wheel-rim and wedges and also simultaneously tighten the same in their sockets in the hub, substantially as described.

In testimony whereof I have signed this specification in the presence of two subscribing witnesses.

WILLIAM L. HUFFMAN.

Witnesses:
   J. L. JEFFRIES,
   JNO. S. BARBOUR.